United States Patent
Watanabe

(10) Patent No.: US 6,857,877 B1
(45) Date of Patent: Feb. 22, 2005

(54) RECORDED MEDIUM ON WHICH PROGRAM FOR DISPLAYING SKILL, ACHIEVEMENT LEVEL, DISPLAY DEVICE, AND DISPLAYING METHOD

(75) Inventor: Yasuko Watanabe, Tokyo (JP)

(73) Assignee: Skill/Vision Co., Ltd., Tokyo (JP)

( * ) Notice: Subject to any disclaimer, the term of this patent is extended or adjusted under 35 U.S.C. 154(b) by 0 days.

(21) Appl. No.: 10/130,111
(22) PCT Filed: Dec. 8, 1999
(86) PCT No.: PCT/JP99/06863
§ 371 (c)(1), (2), (4) Date: May 15, 2002
(87) PCT Pub. No.: WO01/43002
PCT Pub. Date: Jun. 14, 2001

(51) Int. Cl.⁷ .............................. G09B 19/00
(52) U.S. Cl. .................. 434/219; 434/118; 434/323; 434/350; 705/1; 707/704.1
(58) Field of Search ............... 434/118, 219, 434/322, 323, 350, 362, 365; 700/92; 705/11, 30, 65; 707/100, 102, 104.1

(56) References Cited

U.S. PATENT DOCUMENTS

| | | | | |
|---|---|---|---|---|
| 5,083,271 A | * | 1/1992 | Thacher et al. | 700/92 |
| 5,237,498 A | * | 8/1993 | Tenma et al. | 705/30 |
| 5,257,185 A | * | 10/1993 | Farley et al. | 707/100 |
| 5,453,601 A | * | 9/1995 | Rosen | 705/65 |
| 5,823,781 A | * | 10/1998 | Hitchcock et al. | 434/118 |
| 5,978,767 A | * | 11/1999 | Chriest et al. | 705/1 |
| 5,991,595 A | * | 11/1999 | Romano et al. | 434/353 |
| 6,275,812 B1 | * | 8/2001 | Haq et al. | 705/11 |
| 6,341,212 B1 | * | 1/2002 | Shende et al. | 434/350 |
| 6,368,110 B1 | * | 4/2002 | Koenecke et al. | 434/219 |
| 6,385,620 B1 | * | 5/2002 | Kurzius et al. | 707/104.1 |
| 6,513,042 B1 | * | 1/2003 | Anderson et al. | 707/102 |
| 2001/0039508 A1 | * | 11/2001 | Nagler et al. | 705/11 |
| 2002/0119430 A1 | * | 8/2002 | Szynalski | 434/219 |

* cited by examiner

*Primary Examiner*—Joe H. Cheng
(74) *Attorney, Agent, or Firm*—Sughrue Mion, PLLC

(57) ABSTRACT

A recorded medium on which a program for displaying an index of skill achievement level of vocational field concerning the skills that one or more users have is recorded. The program is a (skill-map) displaying program characterized in that the program has a table having item (a) where the results of evaluation of the degrees of achievement of skill items necessary for the vocational field by a predetermined evaluating method are inputted as numerical values and item (b) where the reference values of the skill items are inputted as numerical values, the numerical values inputted to table (a) and those of table (b) are compared to display the skill achievement levels of the users at the input time and the reference values for comparison. Such a program is used especially through a network to facilitate the matching of a vocation and the business management for companies and to help the user make a skill-up plan and know the market value of the user. A skill map displaying device and a displaying method are also disclosed.

23 Claims, 3 Drawing Sheets

Main Menu

User' ID     U1
Job Main Category     I T
Annual income     ¥ ●● Hundred Thousand SkillMAP [Level 1]

| Skill Items | Ev. | Std. S1 | Std. 2 | Av.S' |
|---|---|---|---|---|
| C1 | 8 | 6 | 8 | 5.4 |
| C2 | 4 | 6 | 8 | 4.3 |
| C3 | 9 | 6 | 8 | 6.2 |
| C4 | 3 | 6 | 8 | 4.8 |
| C5 | 8 | 6 | 8 | 6.2 |
| C6 | 5 | 6 | 8 | 6.2 |
| C7 | 7 | 6 | 8 | 5.3 |
| C8 | 8 | 6 | 8 | 6.1 |
| C9 | 2 | 6 | 8 | 3.9 |
| C10 | 4 | 6 | 8 | 4.8 |

Main Menu

User' ID               U1
Job Main Category      IT
Annual income          ¥ ●●   Hundred Thousand

SkillMAP [Level 1]

| Skill Items | Ev. | Std. S1 | Std. 2 | Av.S' |
|---|---|---|---|---|
| C1 | 8 | 6 | 8 | 5.4 |
| C2 | 4 | 6 | 8 | 4.3 |
| C3 | 9 | 6 | 8 | 6.2 |
| C4 | 3 | 6 | 8 | 4.8 |
| C5 | 8 | 6 | 8 | 6.2 |
| C6 | 5 | 6 | 8 | 6.2 |
| C7 | 7 | 6 | 8 | 5.3 |
| C8 | 8 | 6 | 8 | 6.1 |
| C9 | 2 | 6 | 8 | 3.9 |
| C10 | 4 | 6 | 8 | 4.8 |

RECORDED MEDIUM ON WHICH PROGRAM FOR DISPLAYING SKILL, ACHIEVEMENT LEVEL, DISPLAY DEVICE, AND DISPLAYING METHOD

BACKGROUND OF THE INVENTION

1. Field of the Invention

The present invention relates to a recorded medium on which program for displaying an index of skill achievement level of vocational field concerning the skills possessed by at least one user, a display device, and a displaying method. more specifically, the present invention relates to a display device, a displaying method, and a recorded medium on which program displays a skill achievement level of a user in a vocational field that the user's skill concerns compared with the standard level in the field, and more particularly, to a recorded medium installed in a stand alone computer system, or a set of computer system that plurality of computers are connected to each other, such as a LAN system, a WAN system, an intranet, or an extranet.

2. Prior Art

Computers, particularly the Internet are widely used in recent years. The percentage of computer users is a growing trend, in business as a matter of course, also among from computer engineers to engineers of every kind, or among personal users who are in the age group from late teens to 30s. The Internet is also being used effectively for a method to collecting formation of every kind.

The way of information delivery is changing with these widespread use of computers and the Internet.

For instance, job information by a company is provided via the Internet as well as newspapers or magazines. The job information includes information of a company, such as a name of the company, a contact address, a place of employment and a recruitment staff, and a kind of work, conditions of employment, such as required skills, annual income, working hours, all kinds benefits, and age.

Some shortcomings, however, exist in the job information provided via information media such as newspapers or magazines. For example, the details of the job are likely to be unclear because the space in a newspaper or magazine for printing information is limited. Moreover, there is a time lag between recruitment time period and actual posted date (information-providing period) in the newspaper or magazine, so that a company may not be able to attract talented people in good time, or a recruitment staff may have to respond to inquiries from applicants about the job information after the company has already made a hiring decision. There is also a problem with decision whether to apply to a company because an applicant may not know the details of the job until the applicant goes to an actual interview, and the applicant may determine a difference between the desired job and the actual job of the company.

There is a further problem with the information-providing period that an applicant has difficulty obtaining new job information until the day for help-wanted column in a newspaper or the publication date of the job information magazine.

On the other hand, job information provided via the Internet can provide much more job information than conventional mediums such as the newspaper or magazine, and can provide the information in real time. Thus, it is very favorable to provide job information using method such as the Internet.

As illustrated in FIG. 1, an applicant contacts contact a target company based on information placed in the a newspaper, magazine or the Internet, and the applicant their personal information such as resume or work experience. (STEP 1)

The company that has received the applicant's personal information generally screens applicants by examining their documents, and decides whether to carry out secondary screening. (STEP 2)

The applicant who passed the documentary screening may then be subject to secondary screening such as an interview or a written examination, and the company determines the acceptability based on a result of the secondary screening. (STEP 3)

If necessary, the company may also determine the acceptability by carrying out tertiary screening, but detailed description is omitted here because it is as same as that described as the secondary screening.

The job offering company make applicant's yes/no decision through these steps.

The deciding method for recruiting as mentioned above has following disadvantage for both a job offering company and a job applicant.

(Applicant)
1. The company may offer a job with a condition that does not meet applicant's requirement, or that is unreasonable, because a company cannot determine the difference between the requirement level of the company for a job and that of an applicant has at the time.
2. Once an applicant has been rejected at a document screening or secondary screening, the applicant may have later difficulty applying with the company even if the applicant has improved their level of skills through studies and experiences.
3. It is difficult for the applicant to know the appropriate employment conditions such as pay that meet the applicant's level of skills.

(Job Offering Company)
1. If a large number of applicants apply for a job, it takes a lot of effort to carry out the documentary screening, particularly to carry out the secondary screening. And because contents and form of an application are not standardized, it is difficult to compare the applicants each other.
2. A company cannot get enough, preferably objective information of applicant's skill that meets the job, along with personal information such as a resume.

Moreover, in recent years, a recruiting system has been utilized wherein various information of job-finding or job-changing engineers etc. are registered, and a job offering company can make contact with a suitable engineer based on the registered information.

In this recruiting system, a skill achievement level that each engineer concerns in his vocational field is unclear in the same way, thus a company may have difficulty determining whether an applicant meets the conditions of employment.

Therefore, a method for matching a job applicant with a recruiting company is expected.

A job applicant such as a engineer intends to improve their career skills (hereinafter referred to as the "skill-up") or to increase work experience (hereinafter referred to as the "career-up") for getting a desired type of job and for acquiring related skills as much as possible. For the skill-up and the career-up, applicants get necessary information from various information mediums such as magazines, books and the Internet, and choose a necessary studying method and an educational facility or the like based on the information. These skill-up and career-up are common problems not only for a job applicant but also for an engineer who is not finding a job such as an employee in a company, a dispatched engineer and free-lance, and for a student who will find a job in the future, who makes an effort to improve his skill and acquire experience.

A number of shortcomings, however, exist in getting the skill-up or career-up through these methods as follows.

1. Since a job applicant or a prospective job applicant such as a student does not know whether he has enough skills or not for a job of his choice, and it is not clear how much level is required for the job in improving his skills. Therefore, a job applicant or a prospective job applicant cannot study properly and effectively.

Also, an engineer who belongs to a company, for instance who is in specific technical field does not understand his level of skills, and he may not know his strong points and weak points clearly. Therefore, the engineer has difficulty properly planning a skill-up program or career-up program.

2. If a person intends to improve his skills with documents or books, too much information makes it difficult to compare and choose proper one. And it is difficult to get real-time information through these methods.

Thus, under the present circumstances, a job applicant such as a engineer, computer engineer and student cannot measure his level of skills at present. And even if the applicant attempts to find a more professional job, it is difficult to understand what type of career-up the applicant should plan in this situation.

On the other hand, it is difficult for a company, which has a large number of engineers of the same category e.g. computer engineers, to evaluate skills and experience level of each engineer objectively and thoroughly. Therefore, proper evaluation and staffing according to the skills and experiences of each engineer is not done under these circumstances. A company or a temporary employment agency that dispatches engineers has need, in an occasion that needs one or more engineers at a new business or new project, for finding a engineer who satisfies the required skills for the project and for adjusting or managing a schedule of the engineer.

Moreover, there is a strong need for an integrated system displaying an index of skill achievement level of a vocational field that each engineer concerns, facilitating the skill-up and career-up plan according to the displayed contents, enabling a company to evaluate the engineer according to the skills, being able to pick up a engineer who has enough skills in a certain technique and being able to manage an engineer's schedules, etc.

DISCLOSURE OF THE INVENTION

Therefore, an object of the present invention is to provide a recorded medium on which program for displaying an index of skill achievement level of vocational field concerning the skills that one or more users have, and to provide a display device and a display method.

Another object of the present invention is to provide a method for matching a user who wishes to apply for a job with a job offering company in a proper way according to the recorded medium which stores the displaying program, and to provide a display device and a displaying method.

A further object of the present invention is to provide a proper method for planning the proper skill-up and career-up for a user according to the recorded medium that stores the displaying program, and to provide a display device and a displaying method.

Another object of the present invention is to provide a recorded medium on which a program is stored, which program enables to evaluate and staff an engineer properly according to the skills and experience, and the program can select a particular engineer who satisfies the required skill for the project, and to adjust and manage schedule of the engineer, in cases where a company needs one or more engineers for a new business or project etc.

A further object of the present invention is to provide a recorded medium on which integrated program makes it possible to display an index of skill achievement levels of a vocational field concerning the skills possessed by at least one user, to plan the skill-up and career-up based on the displayed contents, to evaluate an engineer properly according to his skills for a company, to select an engineer who has sufficient skills related to a certain technique, and to manage a schedule etc. of the engineer.

In the light of aforementioned objects, the inventor of the present invention has achieved this invention through finding out that these objects are solved by following constitution, that is to say, a program for displaying an index of skill achievement levels of a vocational field concerning the skills possessed by at least one user, comprising: a table having a field (a) and a field (b), the field (a) storing a result after numerically evaluating at least two items of skill achievement level required in the vocational field in accordance with a certain evaluating method, and the field (b) storing a numerical standard value of each skill achievement level in the vocational field; comparing a value to be stored in the table (a) with the value in the table (b); and displaying a user's skill achievement level at the time of storing the result comparing with the numerical standard value.

More specifically, the present invention relates to following items.

A first embodiment of the present invention relates to a recorded medium on which program for displaying an index of skill achievement level of a vocational field concerning the skills possessed by at least one user, comprising: a table having a field (a) and a field (b), the field (a) storing are a result after numerically evaluating at least two items of skill achievement level required in the vocational field in accordance with a certain evaluating method, and the field (b) storing a numerical standard value of each skill achievement level in the vocational field; comparing a value to be stored in the table (a) with the value in the table (b); and displaying a user's skill achievement level at the time of storing the result comparing with the numerical standard value. (Hereinafter referred to this displayed result of a user's skill achievement level comparing with a standard value as the "skill-map")

According to this embodiment, the user's skill achievement level can be displayed visually comparing with a standard value.

In the recorded medium having the program, the aspect may comprise these functions: evaluating at least one of the items of skill achievement level by a skill evaluating program; and storing the evaluated result in the table (a).

According to this embodiment, the skill achievement level can be evaluated more objectively.

In the recorded medium having the program, each item may include one or more specific job items selectable as lower conceptual items of the vocational field, and wherein the medium may further comprise a table (a') which is selected and extracted from the items of skill achievement level of a specific job in the table (a).

According to this embodiment, in a specific vocational field that the user belongs to, the user's skill achievement level that relates to more specific jobs can be displayed visually comparing with a standard value.

In a case that the value of a skill items changes, the embodiment may provide another column aside from the last value of the skill items, and may compare a new value with the last value.

According to this constitution, transition of the value can be displayed visually in a case that the value has changed by studying or leaving jobs relating to the skill items.

Also, the embodiment may comprise a function that enables to display two or more indexes of skill achievement level, each of which relates to two or more different vocational fields.

This embodiment provides an important criterion for selecting a vocational field that is appropriate to actual demand of the user, such as, in the case that the user wish to find a job from plural vocational fields, or in the case that the user is a prospective job applicant who is going to find a job.

Further, in the recorded medium having the program, the one or more items may be arbitrarily selectable from the two or more items of skill.

According to this embodiment, the user can arbitrarily select items that thee user wants to display in comparison.

According to second embodiment of the present invention, there is provided an information display device for displaying an index of skill achievement level of a vocational field concerning the skills possessed by at least one user, comprising: a input unit for inputting information; a storage means for storing the inputted information; a processor for processing the stored information; a display means for displaying the stored information and a result processed by the processor; and whereby displays a user's skill achievement level at the time of storing the result comparing with the numerical standard value according to the program described in the first aspect.

According to a third embodiment of the present invention, there is provided an information displaying method for displaying an index of skill achievement level of a vocational field concerning the skills possessed by at least one user, comprising the steps of: referring a table having field (a) and field (b), the field (a) storing a result after numerically evaluating at least two items of skill achievement level required in the vocational field in accordance with a certain evaluating method, and the field (b) storing a numerical standard value of each skill achievement level in the vocational field; comparing a value to be stored in the table (a) with the value in the table (b); displaying a user's skill achievement level at the time of storing the result comparing with the numerical standard value.

According to the second and the third embodiments, there is provided a display device and displaying method that enable to display a user's skill achievement level at present visually comparing with a standard value.

The displaying program in the first embodiment of the present invention is usable for a host computer or a network system, which includes the host computer and one or more terminals that are connected or connectable to the host computer.

More particularly, according to a forth aspect of the present invention, the program is installed in a host computer and/or a terminal, or both the host computer and the terminal each of which is in a network system, the network system including the host computer and one or more terminals which are connected or connectable to the host computer.

According to this constitution, items of skill achievement level of plural users can be managed on a single table. Thus, it becomes possible to compare the plural user each other.

In this aspect, the network system may be a local area network (LAN) or a wide area network (WAN). If the network is a wide area network (WAN), the program is installed in a host computer. Also, the network system may be an intranet, an extranet or the Internet.

In the forth embodiment of the present invention, there is provided a specific aspect, such as, an information display system for matching a job-finding or job-changing user with a job offering company, wherein the system comprises: a host computer in which skill-map displaying program for inputting personal information is installed; a user's (a job applicant) terminal connectable to the host computer; and a terminal of a third party (a job offering company), connectable to the host computer for searching the user's information.

This information displaying system abstracts desired users and displays the abstracted users on condition that an item of skill achievement level is selected and arbitrary value of the items is inputted from the terminal of the user or the third party.

According to this embodiment, a job-finding user can be properly matched with a job offering company. In other words, it becomes possible to screen applicants, and to judge their skill level objectively as well as to ease the burden of documentary screening and secondary screening.

In this embodiment, it is preferable that user's personal information such as age, address is added to information searching items.

According to this embodiment, it becomes possible to screen users more appropriate for an offer.

Further, in this specific aspect, it is preferable that inputted information of a user is erasable or modifiable from the user's terminal.

Herewith, the data is enabled to erase or modify according to the user's intent, in a case that a change has arisen in applicants' desire, so that the information is prevented from unauthorized dissemination.

Moreover, in this specific embodiment, it is preferable that the host computer has a table for managing ranked information of the third-party, whereby the system restricts display contents of a user's personal information according to the rank of the third party.

According to this embodiment, for example, display of personal information to a guest third-party who try to use this system is prevented, on the contrary, it is enabled to display much more information to a third-party who made a contract such as confidentially agreement.

In the forth embodiment of the present invention, another specific aspect is provided, that is, for example an information display system for displaying a guide that a user, trying to improve his skill achievement level, can plan his skill-up while referring other user's situation in his particular technical field, wherein the system comprises a host computer having a skill-map displaying program that is capable of inputting personal information, and a user's terminal connectable to the host computer. This information display system abstracts desired users and displaying personal information of abstracted users by selecting an item of skill achievement level arbitrarily and inputting an arbitrary value of the items from the terminal.

According to this embodiment, a user can grasp the situation of other users in a specific skill item, who is at the same skill achievement level as he. Particularly, if the displayed information is income or position etc., he can grasp the market value of him. Also, the system gives a guide of how much the user improves his skill achievement level in a specific item, the market value of the user would rise.

Further, in this specific embodiment, it is preferable that useful information for a user, for instance an educational program or a program for displaying an educational facility, is installed in the host computer or another host computer, which is connectable to the host computer.

According to this embodiment, the system enables display a guide for concrete improving method, for a case that a user plan to improve his specific skill achievement level.

Furthermore, according to this specific embodiment, there is provided an information display system, for instance displaying information of company engineer, comprising: a host computer having a program that is capable of displaying a skill-map, for instance a server in a company; a user's terminal connectable to the host computer, for instance an engineer's terminal in a company; a terminal of a third party connectable to the host computer, for instance a manager's terminal in a company; and wherein the host computer abstracts desired users and displays personal information of abstracted users by selecting an item of skill achievement level arbitrarily and inputting an arbitrary value of the items from the terminals.

According to this embodiment, the system enables management all items of skill level of each engineer, for instance all engineers who belongs to a company. Also, it enables a manager in a company to abstract all users who satisfy skill level on required items. Further, it enables to abstract all users who have less skill level on required items, so that a company can plan an education of employees more efficiently.

In this specific embodiment, it is preferable that the personal information of a user includes his schedule, more particularly; it is preferable that the system is linked with a user's schedule management software, or is capable of accepting the output result from the schedule management software. According to this embodiment, for example, a manager in a company can abstract a user's schedule, and allocate jobs to the users based on the abstracted result. For another example, the manager can arrange or transfer a projector one's post of duty (hereinafter referred to as the "assign").

Also, the system may feeds back a result of the user's job to the corresponding skill items according to an achieved job by the user. In this way, user's skill achievement level becomes clearer, for instance, by adding points to the skill items corresponding to the achieved project by a user.

BRIEF DESCRIPTIONS OF DRAWINGS

BEST MODE FOR CARRYING OUT THE INVENTION

An exemplary embodiment of the present invention is thereinafter described in detail with reference to drawings. The exemplary embodiment, however, does not limit the present invention.

Figure 1:
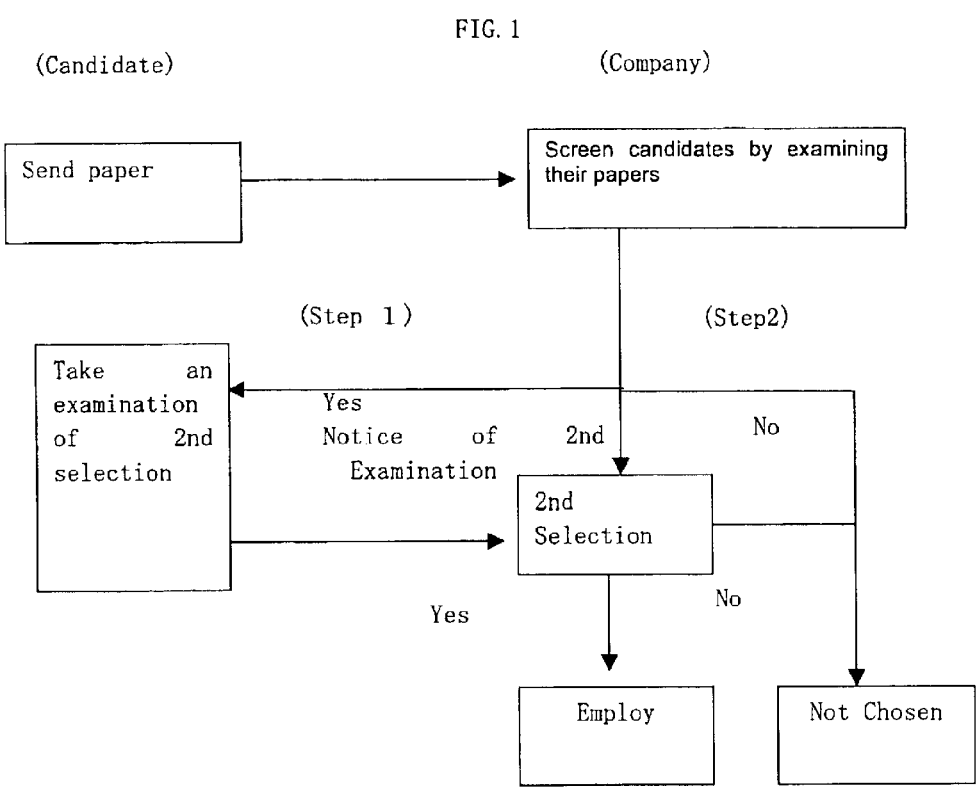
FIG. 1 illustrates a flow chart for evaluating job applicants.
Figure 2:
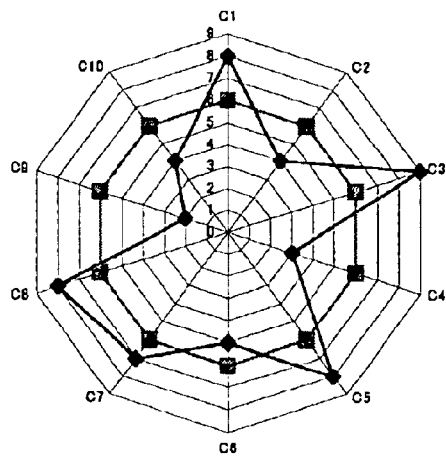
FIG. 2 illustrates an explanatory diagram of a displaying state, according to a display device of the present invention.
Figure 3:
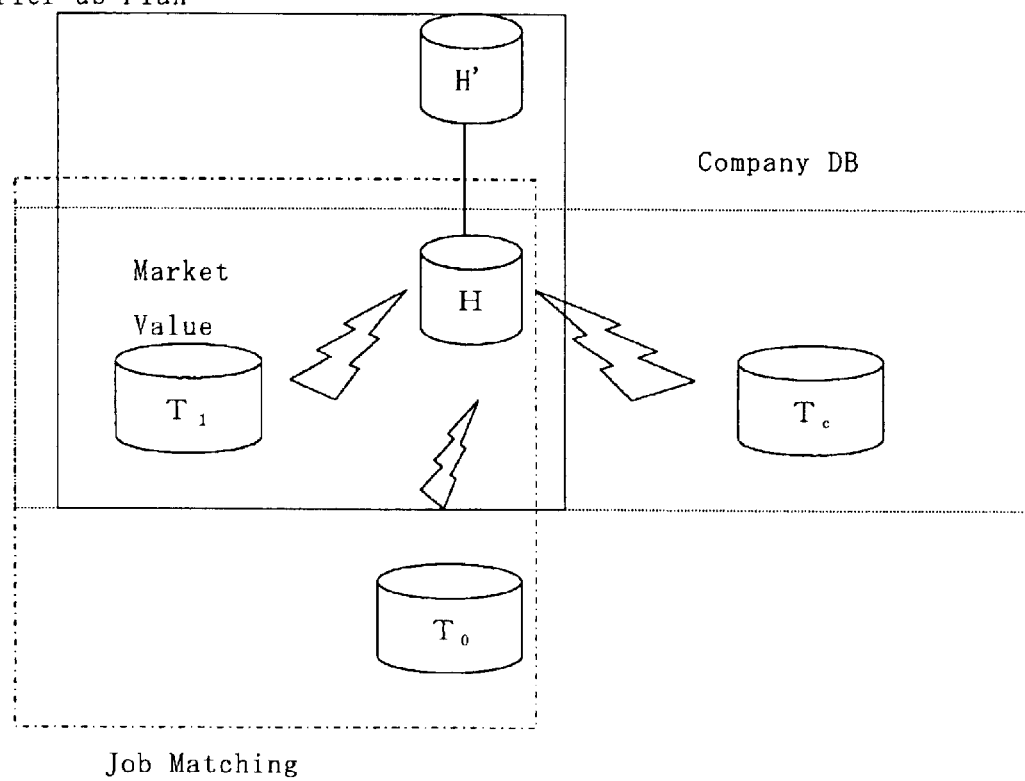
FIG. 3 illustrates a conceptual drawing of a skill-map displaying program adopted for a network system, according to the present invention.

FIG. 1 illustrates a flow chart for evaluating job applicants; FIG. 2 illustrates an explanatory diagram of a displaying state, according to a display device of the present invention; and FIG. 3 illustrates a conceptual drawing of a skill-map displaying program adopted for a network system, according to the present invention.

(Skill-map)

A first embodiment of the present invention relates to a recorded medium having a displaying program for displaying a skill-map, that is, a recorded medium having a program for displaying an index of skill achievement level of a vocational field concerning the skills possessed by at least one user, comprising: a table having a field (a) and a field (b), the field (a) storing a result from numerically evaluating at least two items of skill achievement level required in the vocational field in accordance with a certain evaluating method, and the field (b) storing a numerical standard value of each skill achievement level in the vocational field; the program comparing a value to be stored in the field (a) with the value in the field (b); and displaying a user's skill achievement level at the time of storing the result comparing with the numerical standard value.

The term "user", in the present invention, means a user who registers items of skill evaluation at the recorded medium having a displaying program, or at the display system or displaying method of the present invention, such as an engineer in a certain vocational field.

The items of skill, in the present invention, mean skills that are usually necessary for the vocational field that relate to a user. These items are numerically rated, for instance, on a scale of one to three, four, five, ten or "n", or the items area scoring average or percentage. It can be rated, for example, on a scale of one to four, such as 1 (no skill), 2 (comprehensive with instruction), 3 (comprehensive without instruction), 4 (suited for consulting), or on a scale of one to five, such as 1 (no experience), 2 (less than 5 experiences), 3 (less than 10 experiences), 4 (less than 15 experiences), 5 (more than 15 experiences), or on a score at an examination of various institutions.

Moreover, the wording "numerical standard value", in the present invention, may be a required minimum value or a general average value for the vocational fields, and the numerical standard value may be set for each skill item. The inputted evaluation also maybe a self-evaluation of a user, a ranked result of an examination, or a result numerically evaluated by another program.

As shown in FIG. 2, for example, this system may rate necessary skill items for computer etc. on a scale of one to ten, in a case that a user is a computer engineer, and inputting the rated value to the skill items.

The method for displaying a level of a self-evaluation comparing with the numerical standard value is not limited, as long as it can display the difference between the user's present evaluation and the standard value. For example, the method may be to illustrate with a radar chart as shown in FIG. 2, to show visually with a bar graph or deviation graph, or to show a ranking of a user with a value such as "the xth place out of n" or with a graph. Furthermore, the method for displaying may take one or more methods out of these methods.

These displays enable a user to compare his present achievement level of each skill with required level in his vocational field.

Also, in the recorded medium having a displaying program of the first embodiment of the invention, the program may comprise a field (a') for each lower classified job, and the field (a') relates to a job of a lower class such as service engineer, and is corresponding to a field (a) that relates to a skill item of an upper class job such as computer business.

In this way, by abstracting a skill item of a lower class job that corresponds to that of an upper class job, the user can visually confirm a difference between the user's level and a standard level of a particular job. Also an item that is necessary to be studied or to be experienced can be recognized in a more particular job, so that the user can plan for skill-up or career-up.

Moreover, in a case that the value has changed by studying or performing jobs relating to the skill items, a new value may be inputted into the skill items. In this case, the first embodiment may have another column aside from the last value of the skill items, and may compare a new value with the last value.

According to this embodiment, transition of the user's growing skill level can be displayed visually. In this embodiment, for example, the method may calculate the rate of increase by inputting the first value as the area a1 of the radar chart and inputting the last value as the area a2.

Also, the user may select multiple skill items, and the program may display the items in comparison with the standard value, or in some cases, with the last inputted result. According to this embodiment, the program can display only the selected and necessary items for the user.

(Display Device)

A second embodiment of the present invention relates to a information display device comprising: a input unit for inputting information; a storage means for storing the inputted information; a processor for processing the stored information; a display means for displaying the stored information and a result processed by the processor; and whereby the storage means has a table having a field (a) and a field (b), the field (a) storing a result after numerically rating at least two items of skill achievement level on a scale of one ton required in the vocational field in accordance with a certain evaluating method, and the field (b) storing a numerical standard value of each skill achievement level in the vocational field; and the device displays a result of comparison between a user's skill achievement level and a standard value by processing with the processor, according to an inputted result in the field (a) by a user with the input unit and an inputted result in the field (b).

The display device comprises, in the present invention, an input unit such as a keyboard or a mouse, an information storage means such as a hard disk drive, an ATA drive, a compact flash or a flexible disk drive, a processor that processes the stored information such as a CPU, and an output unit such as a display unit or a printer, to be more precise, the display device may be a information device such as a computer system, a word processor and a PDA.

By installing the program described in the first embodiment of the present invention into these devices, it is possible to display a user's skill achievement level comparison.

Detailed description here is omitted because it is as same as that described in the first embodiment. The recorded medium and the display device of the present invention may be used by one user, or may be possessed in common by plural users.

Furthermore, the recorded medium having the program for displaying the skill-map may be a medium such as a flexible disk (FD), a CD-ROM or a DVD-ROM, or the program may be used by being installed into a hard disk drive through these media, and if a user wish to install into a PDA or a notebook computer, the recorded medium may be a dedicated ROM or a CF card. In addition, for instance, the skill-map displaying program may be uploaded on the Internet, and a user may download it and install into a storage means such as a hard disk drive.

These mediums also may be installed the education program and an evaluation program for evaluating one or more skill items all together, so that a user can numerically evaluate by these programs. In addition, the display device may comprise a means for inputting the outputted information from the evaluation program into the skill-map displaying program through a program for ranking the evaluated result of the evaluating program as numbers. According to this constitution, even if a numerical evaluation change as time goes by, the device can update the value.

Moreover, the device maybe installed plural of the skill-map displaying program of the different skill fields all together. According to this constitution, a prospective job applicant, who will find a job in the future, can know the guide for his appropriate job, and can plan the skill-up or career-up as will hereinafter be described in detail in the paragraph of "Skill-up and Career-up Plan".

(Displaying Method)

A third embodiment of the present invention provides an information displaying method for displaying an index of skill achievement level of a vocational field concerning the skills possessed by at least one user, comprising the steps of: referring a table having field (a) and field (b), the field (a) storing a result after numerically evaluating at least two items of skill achievement level required in the vocational field in accordance with a certain evaluating method, and the field (b) storing a numerical standard value of each skill achievement level in the vocational field; comparing a value to be stored in the field (a) with the value in the field (b); displaying a user's skill achievement level at the time of storing the result of comparing the values in field (a) and field (b).

According to the second and the third embodiment, there is provided a display device and displaying method that enable to display a user's skill achievement level at present visually comparing with a standard value.

Detailed description here is omitted like as the second embodiment because it is as same as that described in the first embodiment.

(Network)

A displaying program of the present invention for displaying the skill-map may be applied to so-called "network", and it does expand in application on the network.

The term "network", in the present invention, means a system that comprises so-called "host computer" (server) and "terminals" (clients), each of which is connectable with lines such as public circuits, dedicated circuits, cables or radio transmission.

That is to say, in a forth embodiment of the present invention, the displaying program for displaying the skill-map may be installed in a host computer and/or a terminal, or both the host computer and the terminal, each of which is in a network system, the network system including the host computer and one or more terminals.

By connecting a host computer and terminals with the network in this way, the displaying program is capable of not only displaying multiple users in comparison with each other, but also evaluating their skills by a third party and managing the users. Also, if the user's average value is set as the standard value, it is effective in facilitating the comparison between the multiple users.

In this embodiment, the network system may be a local area network (LAN) or wide area network (WAN). If the network is a wide area network (WAN), the program may be installed in a host computer, and the network may be an intranet, an extranet or the Internet.

An embodiment of the present invention that the displaying program for displaying the skill-map is adopted for the network is thereinafter described in detail.

[Network System]

FIG. 3 illustrates a conceptual drawing of a skill-map displaying program adopted for a network system, according to the present invention.

(Skill-map)

In this embodiment, host computer H comprises users U1, U2, U3 . . . who belong to plural vocational fields of the same categories, skill items C1, C2, C3 . . . that are necessary for the technical field, table (a) that stores the evaluated items of the user's skill achievement level, a column that stores a standard value S1, S2, S3 . . . of the each skill items and a column that stores the average values S'1, S'2, S'3 . . . of the users(FIG. 2).

Each user U1, U2, U3 . . . inputs the evaluated value which is evaluated by a certain evaluating method from the terminals T1, T2, T3. Each user registers their skill achievement level into the host computer in this way. If necessary, the host computer may have columns on another table, for example, to store each user's name, contact addresses (address, telephone number, fax number, affiliation, cellular phone number and e-mail address etc.), and personal information (ID number, background, work-experience, family make-up and present annual income etc.). If the network system is a network of a company and the users are the employees of the company, the host computer may have another table for storing the each user's schedule.

(Job Matching)

The skill-map displaying program connected to a network is preferably used as a job matching, for instance, to match a job offering company for a user who is finding a job (Hereinafter referred to as the "job matching system").

As illustrated in FIG. 3, a displaying program of the present invention for displaying the skill-map is installed in host computer H. User U who is searching a job accesses host computer H from terminal T1 of the user U and inputs skill items that relates to the job.

In this embodiment, it is preferable that the system have a column for storing personal information, name if preferable, pronunciation of the name, address, age, telephone number, present annual income, desired annual income, family make-up, condition of health, background, work-experience, license, number of years of experience etc. It is also preferable for the system to input this personal information in a form of a resume or work-experience. According to this embodiment, the system enables management personal information with unified format among the users.

In this way, each user's (job-finding or job-changing user in this embodiment) skill achievement level of each skill item and personal information of each user is inputted into the host computer H.

On the contrary, a job offering company selects a technical field (main category of a job, for example in FIG. 2), or selects a lower class kind of job (in other words, more concrete kind of job), and selects skill items, and decides the required skill achievement level for the selected skill items, and input these values with their terminal Tc according to the conditions of employment.

As illustrated in FIG. 2, in a case of ratings on a scale of one to ten, an abstracting condition is decided, for example, "the user whose evaluation of the items C1, C2 is greater than 6 or 7". Furthermore, it is preferable that the system includes a searching condition of personal information that suits the conditions of employee, such as user's age (age limit), area of the address and number of years of experience, in addition to the before mentioned skill items.

By deciding the abstracting condition and searching in this way, users who meet these conditions is abstracted. This searching method is achieved by well-known method in the computer business.

In this way, suitable user is abstracted by deciding conditions of employee and searching with terminal Tc. The conventional burden of documentary screening and secondary screening is eased, because the abstracted users suit for the conditions of employee for the company.

Moreover, it is preferable that the system enables the registered data on the host computer to be erased or modified by the user, for example for the case that a user has selected a job. According to this embodiment, the erased or modified user is prevented from being abstracted with the terminal of third party who wishes to find a job applicant, so that the information is prevented from unnecessary disclosure and it is effective in excluding uncertain information for a company.

The method for erasing or modifying the data is selected arbitrarily from well-known method in computer business, and a user may also request a host computer operator to erase the data with a notice such as e-mail or facsimile. In this case, the data may be erased completely, or the user may set the data not to be searched for job finding or job changing in after-mentioned system that is combined for another object. In particular, if the host computer H serves a job matching and another system of the present invention, and the user wishes to use another displaying system, for instance a displaying system for the career-up and skill-up, the inputted data of the user in the job matching system may be modified not to be searched or abstracted by a terminal Tc of a third party instead of erasing the whole inputted data. This method can be achieved by a well-known method in the technical field.

Moreover, the present invention includes a system, for example, that the host computer H manages terminal Tc with a certification etc, and alters the displaying contents in accordance with the level of terminal Tc.

In other words, the system may be configured so as not to display user's personal information if a terminal, which does not register officially, tries to use the system from a company (so-called "guest"), and the system may be configured to display the personal information in accordance with a contract that agreed about the handling of the user's personal information between the user and the operator of the host computer H.

According to this embodiment, the personal information of a user will be secured more completely.

Further, the system may comprise a page having a check box of finding a job, and a user may transmit the data with unchecking the box, or the system may be constituted to erase the data table by a resetting means in a case that the user does not wish to find a job because of employment by a company, so that the user's personal information is prevented from unnecessary disclosure after the employment.

A job offering company accesses the host computer H by inputting a prescribed password from a terminal. And the company can select a user who has required skill level by searching a user who has more value of skill level on certain skill items in accordance with the before mentioned conditional search. Selecting a user in this way has a large effect on easing the burden of documentary screening in the past.

If necessary, the system may be configured for downloading personal information of a user with a prescribed format such as resume or work-experience. This system has an effect on enabling a comparison of personal information of multiple users, who have been selected under a certain condition, with unified format
(Market Value)

According to this embodiment, a user can compare himself with another user as well as that a job applicant and a job offering company can exchange information each other.

In other words, a user can select another user and see the user's information through searching the user by selecting a skill item and inputting an arbitrary value.

In this embodiment, the personal information may be, for instance, annual income, position and so on. Also, the system may display a skill achievement level of a user with a radar chart, and calculate annual income or hourly pay from the area of the radar chart with reference to a statistics on the relation between the area of the radar chart and annual income or hourly pay. In this way, a user can know his market value (annual income, hourly pay, position etc.) from his own skill items.

If a user is a prospective job applicant such as a student, the user can utilize the system as effective materials for knowing the practical engineer and deciding his course in life by arbitrarily inputting skill items regarding to his desired job. In this case, it is preferable that the host computer is installed a program for displaying a skill map of a plural different fields such as fields of computer and design, thereby the user can weigh the state of each field.

The market value displaying system and the displaying system for job matching may be combined together into one body, or may be provided separately.
(Skill-up and Career-up Plan)

In the same way, a user can plan the skill-up or career-up etc. that mainly improve his weak skill items for the purpose of increasing his market value.

The host computer may connect with a computer H' that has a educational program such as a computer in a educational facility, thereby a user can plan the skill-up and career-up by executing the program from a terminal. And the system may be configured for enabling a user to confirm the contents of the career-up seminar and its schedule from the user's terminal, and for enabling to apply to the seminar.

According to this embodiment, there is an effect on planning the skill-up and career-up in real time.

It is also preferable that the host computer is installed a unified program, for example a IT test program if the technical field is IT field, thereby a user can be evaluated in a unified way. This constitution enables evaluation of each skill item more objectively and in a unified way.
(Network Inside a Company)

The displaying program of the present invention for displaying the skill-map is usable as so-called "skill database" that have items of skill evaluations as employees, if the program is installed in a host computer in a company.

This embodiment enables to manage skill achievement level of each user as an employee totally or individually from the terminal Tc of a third party other than the user, such as a recruiting staff or personnel manager.

This system enables to educate employees more efficiently by managing skill achievement level of each employee according to each item, for example, a company can educate users together whose evaluation of a skill item is less than the standard value. This searching and abstracting of users is achieved by the same method before, and when a company wishes to educate the employees, the same system is usable before mentioned in "Skill-up and Career up Plan".

Further, this embodiment of a displaying system can manage schedules or projects of each engineer (project assignments such as assignments or changes of users to a project) by linking the skill-map displaying program of the present invention with a job-schedule managing program of each user.

Displaying user's schedules together with the skill-map may be achieved by adding an item of job schedule as a search condition of course, but the search of the user's information and schedule may also be carried out independently (limit search). This searching method is achieved by a well-known method in the technical field. This job-schedule managing program does not limit if it can carry out a conditional search and can display the result. It is generally preferable that a program that a company already has is applied to the system with adjustment.

In this way, when a new job or a new project started, this system enables selection of a user, in other words an employee, who has a sufficient skill level required for the job or the project, and management the job or assignment the project with reference to the schedules of the selected employees.

It goes without saying that the job management and the project assignments are applicable to choice of personnel for temporary employment agencies that have many users who have specific skills or for a company that requests the outsourcing of a certain technical skill to the agencies.

INDUSTRIAL APPLICABILITY

The recorded medium having a program for displaying a skill-map, and a display device and a displaying method for displaying a skill-map, has a beneficial effect as described below.

(1) It enables display visually a present skill achievement level of a user in comparison with a standard value.

(2) When configured such that a skill evaluation program which numerically evaluates at least one skill item and stores the result in the table (a), the present invention enables evaluation of skills more objectively.

(3) When configured such that each item includes one or more specific job items selectable as lower conceptual items of the vocational field, and the medium further comprises a table (a') which is selected and extracted from the items of skill achievement level of a specific job in the table (a), the present invention can display a present skill achievement level of a user more concretely comparing with a standard value in a specific vocational field that a user belongs to.

(4) When configured such that the program has another column aside from the last value of skill items for a case that the value of skill items changes, and a new value is compared with the last value, the present invention enables to display the transition of the skill achievement level for a case that the value has changed by studying or leaving jobs relating to the skill items.

(5) Moreover, if the medium storing the program is configured such that the table (a) includes a separate new item of skill achievement level in addition to the items of skill achievement level, and the medium displays transition of the skill achievement level by comparing the new item with the items of skill achievement level, then a transition of a specific skill item can be displayed visually. Therefore, a user can know his skill-up or career-up by study or experience visually.

(6) When configured such that at least two skill items are arbitrarily selectable in the recorded medium, a user can set items that he wish to display comparing together.

Furthermore, by applying the displaying program of the present invention for displaying the skill-map to a host computer and/or to a terminal on a network system, the present invention has a beneficial effect as described below.

(7) Plural users are displayed in comparison, and besides, a third party can evaluate the user's skill and manage the users. Also, if an average of users are set as the standard value, there is an effect on facilitating comparison of plural users.

(8) By installing the displaying program of the present invention for displaying the skill-map in a host computer that is connected to a personal user, the user can know his market value based on a relation between a skill achievement level of other users and their incomes, and he can also plan the skill-up and career-up for improving his market value effectively. Especially, with a configuration that the host computer or another computer includes a program such as an educational program, displays an educational schedule such as a seminar, or is acceptable for the seminar's application, the user can plan the skill-up and career-up from his terminal directly.

(9) Also, if the host computer on a network is installed a program for arbitrarily selecting an skill evaluation item and searching a user by arbitrarily inputting a value into the selected item in addition to the program of the present invention for displaying the skill-map, a job offering company can select the job applicant from their terminal directly. In this case, there is an effect on easing the burden of a documentary screening.

(10) Moreover, by installing the displaying program of the present invention for displaying the skill-map into a host computer of a company, so-called "skill database", which can manage the skill achievement level of each user, the company can evaluate the users more precisely and carry out training more appropriately. Also, by installing a program for managing each user's schedule into the host computer, the company can manage schedules or can easily assign appropriate personnel to a new project or business.

What is claimed is:

1. A computer program product for displaying skill achievement levels for a plurality of skills of a vocational field possessed by at least one user, the computer program product comprising:

a computer readable medium;

a first table which is stored on the computer readable medium and includes a first field and a second field, the first field storing numerical user values corresponding to skill levels of a user for the skills required in the vocational field, and the second field storing numerical standard values corresponding to standard skill levels for the skills required in the vocational field; and a program which is stored on the computer readable medium, the program executable on a computer to perform a method comprising:

comparing a numerical user value stored in the first field with a numerical standard value stored in the second field; and graphically displaying a skill achievement level of the user based on a result of the comparing the numerical user value with the numerical standard value.

2. The computer program product as claimed in claim 1, wherein said method further comprises determining the numerical user value using a predetermined skill evaluating procedure, and storing the the numerical user value in the the first field.

3. The computer program product as claimed in claim 1 or 2, wherein the vocational field includes at least two jobs having different classification levels, and said a second field includes numerical standard values corresponding to the standard skill levels for the skills required in the two jobs.

4. The computer program product as claimed in claim 1, wherein the method displays at least two skill achievement levels.

5. The computer program product as claimed in claim 1, wherein said first field includes current and past numerical user values for at least one of the skills, and wherein the program displays a transition of the skill achievement level by comparing the current and past numerical user values.

6. The computer program product as claimed in claim 1, further comprising a second table which is stored on the computer readable medium and includes personal information of user.

7. The computer program product as claimed in claim 1, wherein the method further comprises selecting at least one of the skills for which the skill achievement level is to be displayed.

8. The computer program product as claimed in claim 1, wherein said program is executed on at least one a host computer and a terminal of a network system.

9. The computer program product as claimed in claim 8, wherein each of said numerical standard values are computed according to an average of of numerical user values of a plurality of users.

10. The computer program product claimed in claim 8, wherein the method further comprises determining desired users and displaying information of the desired users by selecting and inputting an arbitrary minimum value of the numerical user values via the terminal or the host computer.

11. An information display device for displaying skill achievement levels for a plurality of skills of a vocational field possessed by at least one user, comprising:

a input unit for inputting user information;

a storage means for storing the user information, a program, and first table which includes a first field and a second field, the first field storing numerical user values corresponding to skill levels of a user for the skills required in the vocational field, and the second field storing numerical standard values corresponding to standard skill levels for the skills required in the vocational field;

a processor executing the program stored in the storage means; and a display means for displaying a result processed by the processor wherein the processor compares a numerical user value stored in the first field with a numerical standard value stored in the second field, and graphically displays on the display means a skill achievement level of the user based on a result of the comparing the numerical evaluation value with the numerical standard value.

12. A method for displaying skill achievement levels for a plurality of skills of a vocational field possessed by at least one user, comprising the steps of:

referring to a table having a first field and a second field, the first field storing numerical user values corresponding to skill levels of a user for the skills required in the vocational field, the numerical user values being determined in accordance with a predetermined evaluating method, and the second field storing numerical standard values corresponding to standard skill levels for the skills required in the vocational field;

comparing a numerical user value stored in the first field with a numerical standard value stored in the table second field; and graphically displaying a skill achievement level of the user based on a result of the comparing the numerical evaluation value with the numerical standard value.

13. A information displaying system comprising a host computer; and at least one terminal communicably linked to the host computer, wherein the host computer includes a memory including a program adapted to enable the host computer to perform the steps of:

referring to a table stored in the memory having a first field and a second field, the first field storing numerical user values corresponding to skill levels of a user for the skills required in a vocational field, the numerical user values being determined in accordance with a predetermined evaluating method, and the second field storing numerical standard values corresponding to standard skill levels for the skills required in the vocational field;

comparing a numerical user value stored in the first field with a numerical standard value stored in the second field; and graphically displaying a skill achievement level of the user based on a result of the comparing the numerical evaluation value with the numerical standard value.

14. The information display system claimed in claim 13, further comprising a terminal of the user communicably linked to the host computer; wherein said at least one terminal is a terminal of a third party for searching the information regarding the user; and wherein the program is further adapted to enable the host computer to perform the steps of determining desired users and displaying information of the desired users by selecting one of the skills and inputting an arbitrary minimum value of the numerical user values via the terminal of the user or the terminal of the third party.

15. The information display system as claimed in claim 14, wherein said terminal of the third party is adapted to search for information of users by selecting a skill and inputting an arbitrary numerical user value.

16. The information display system as claimed in claim 14, wherein information of a user is erasable or modifiable from the terminal of the user.

17. The information display system as claimed in claim 14, wherein the memory of the host computer stores a table for managing ranked information of the third-party, whereby the system restricts display contents of a user's personal information according to the rank of the third party.

18. The information display system claimed in claim 13,
wherein the at least one terminal is a terminal of a user; and wherein the program is further adapted to enable the host computer to perform the steps of determining desired users and displaying personal information of desired users by selecting one the skills and inputting an arbitrary minimum value of the numerical user values via the terminal of the user.

19. The information display system as claimed in claim 18, wherein said personal information includes at least one of income and position.

20. The information display system as claimed in claim 18, wherein at least one item of useful information related to said items of skill is installed in said host computer or in another host computer connectable to the host computer.

21. The information display system as claimed in claim 18, wherein said personal information of the users includes a schedule of the user.

22. The information display system as claimed in claim 18, wherein a result of the user's job to the corresponding skill according to a user's job achieved by the user.

23. The information display system as claimed in claim 13, further comprising a terminal of a user communicably linked to the host computer;

wherein said at least one terminal is a terminal of a third party; and wherein the program is further adapted to enable the host computer to perform the steps of determining desired users and displaying personal information of desired users by selecting one of the skills and inputting an arbitrary minimum value of the numerical user values via the host computer.

* * * * *